(12) United States Patent
Bachner

(10) Patent No.: US 8,651,139 B2
(45) Date of Patent: Feb. 18, 2014

(54) VALVE

(75) Inventor: Larry G. Bachner, Cary, IL (US)

(73) Assignee: NiMCO Corporation, Crystal Lake, IL (US)

( * ) Notice: Subject to any disclaimer, the term of this patent is extended or adjusted under 35 U.S.C. 154(b) by 289 days.

(21) Appl. No.: 13/073,758

(22) Filed: Mar. 28, 2011

(65) Prior Publication Data
US 2011/0233444 A1 Sep. 29, 2011

Related U.S. Application Data

(60) Provisional application No. 61/318,304, filed on Mar. 27, 2010.

(51) Int. Cl.
*F16K 1/38* (2006.01)
*F16K 1/44* (2006.01)
*F16K 7/12* (2006.01)

(52) U.S. Cl.
USPC .............. 137/614.11; 137/614.2; 251/339; 141/117

(58) Field of Classification Search
USPC ............. 137/614.11, 614.13, 614.14, 219, 137/614.2; 251/318–323, 359, 361, 364, 251/333, 334, 339; 141/117, 119; 222/571
See application file for complete search history.

(56) References Cited

U.S. PATENT DOCUMENTS

| | | | | |
|---|---|---|---|---|
| 294,674 A | * | 3/1884 | Richter | 137/614.2 |
| 1,395,321 A | * | 11/1921 | Williams | 239/25 |
| 1,402,718 A | * | 1/1922 | Bayles et al. | 137/614.11 |
| 2,242,680 A | * | 5/1941 | Schacht | 239/489 |
| 2,875,976 A | * | 3/1959 | Harwood | 251/321 |
| 3,335,756 A | * | 8/1967 | McPherson | 137/628 |
| 3,587,634 A | * | 6/1971 | Krause | 137/614.11 |
| 4,136,854 A | * | 1/1979 | Ehmig et al. | 251/333 |
| 4,183,705 A | * | 1/1980 | Kice | 414/221 |
| 4,617,955 A | * | 10/1986 | Melgaard | 137/240 |
| 4,627,599 A | * | 12/1986 | Ehmig | 251/333 |
| 5,379,985 A | | 1/1995 | Waij et al. | |
| 6,047,730 A | * | 4/2000 | Coura et al. | 137/614.18 |
| 6,382,239 B1 | * | 5/2002 | Zimmerly | 137/312 |

OTHER PUBLICATIONS

"Technical Specifications EMSIK™ Filling Systems," Waij & Van de Wiel Technology BV, The Netherlands (believed to have been published more than one year before the present application's priority date).
"EMSIK™ Multi Purpose Filling Systems," Waij & Van de Wiel Technology BV, The Netherlands (believed to have been published more than one year before the present application's priority date).

* cited by examiner

*Primary Examiner* — John Rivell
(74) *Attorney, Agent, or Firm* — Barnes & Thornburg LLP

(57) ABSTRACT

A valve includes a body, a plug and a diaphragm defining an aperture and a seat. The diaphragm is substantially movable in response to a force applied to the seat by the plug. The valve can be cycled between an open state in which the plug is free of the seat, a closed state in which the plug is seated against the seat, and a third state in which the plug is seated against the seat and substantially deflects the diaphragm.

29 Claims, 11 Drawing Sheets

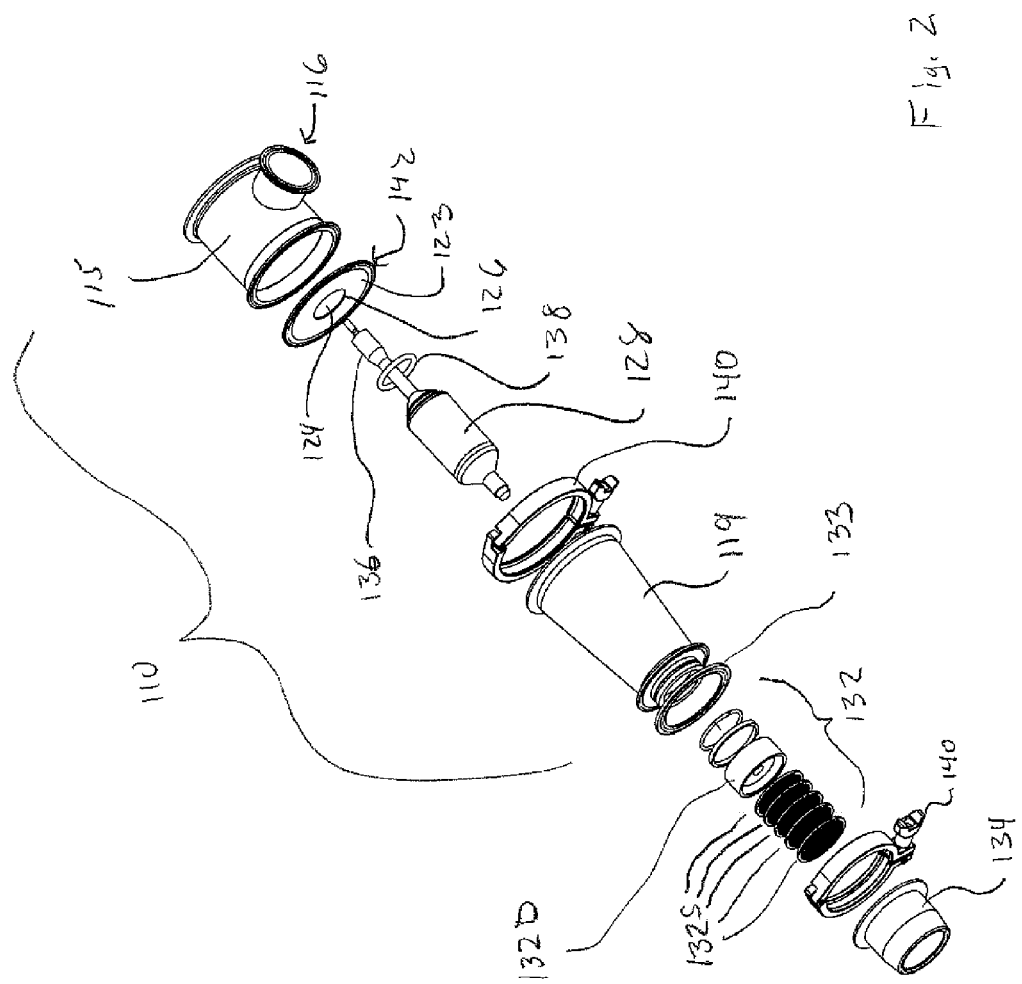

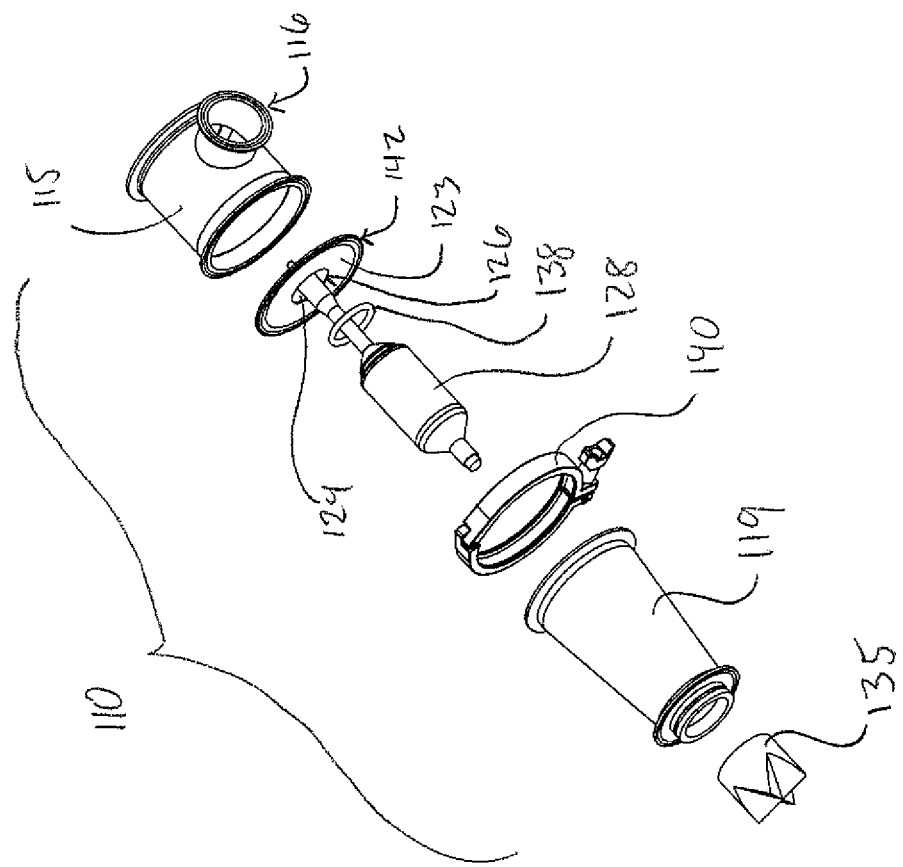

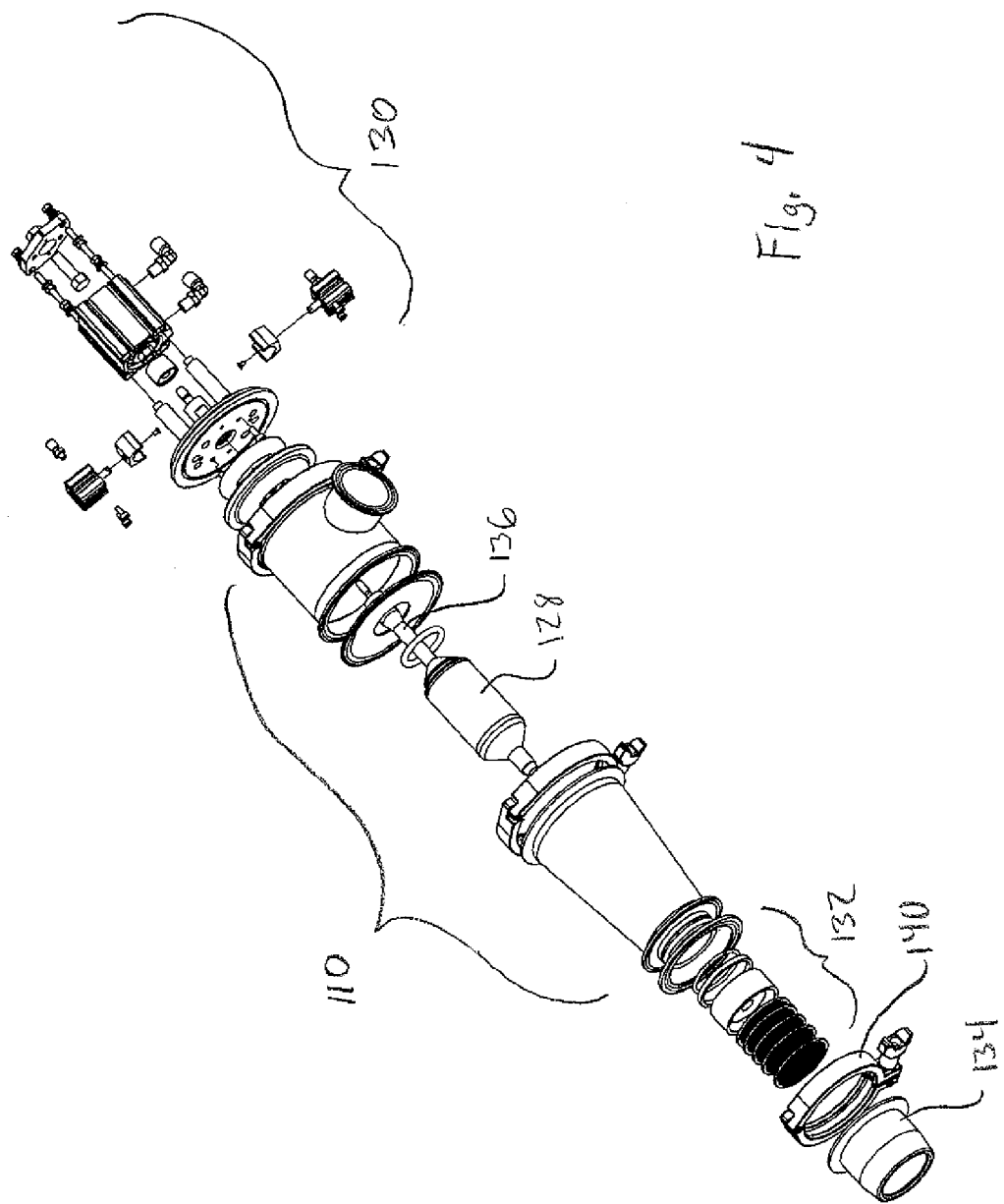

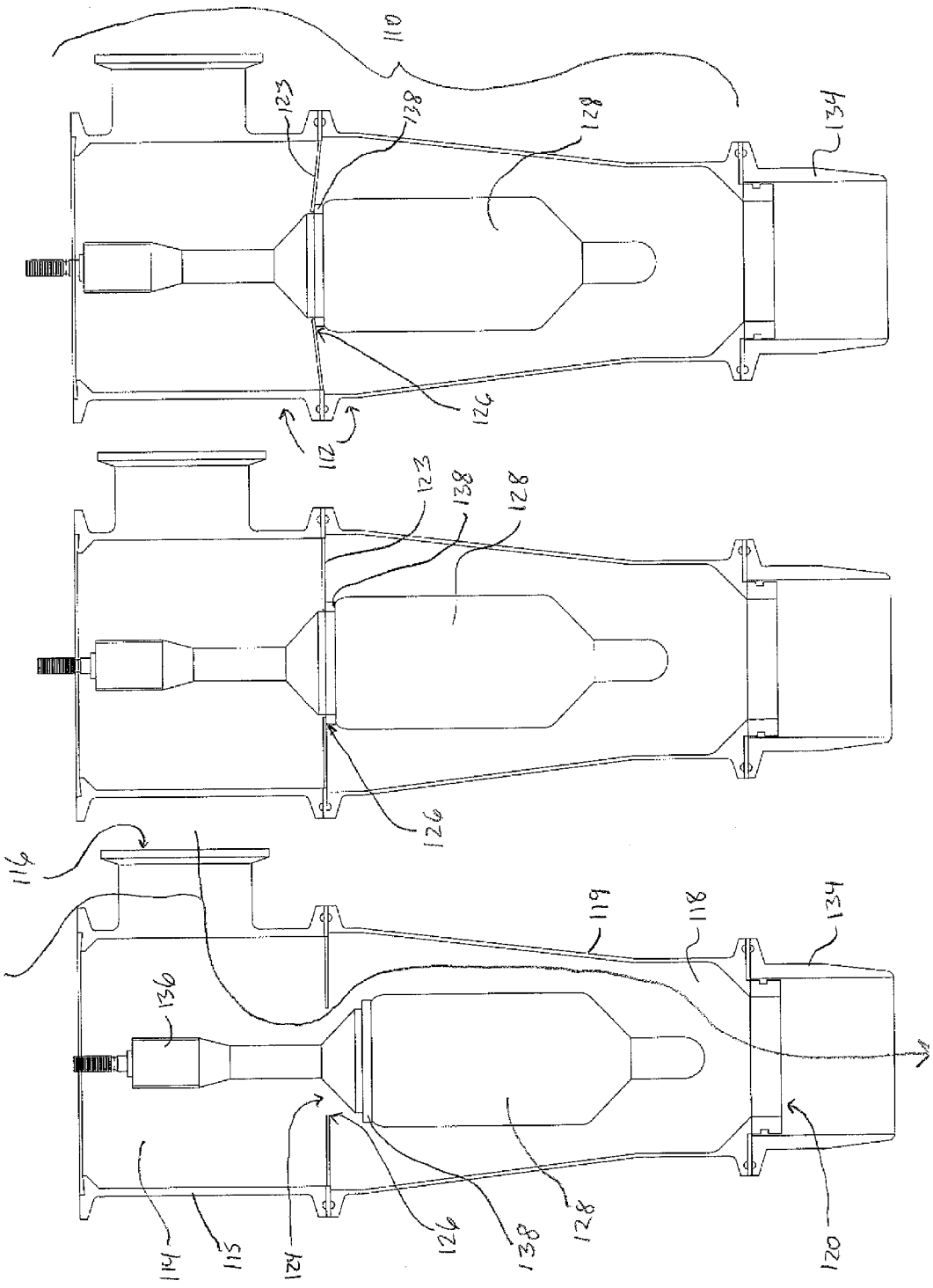

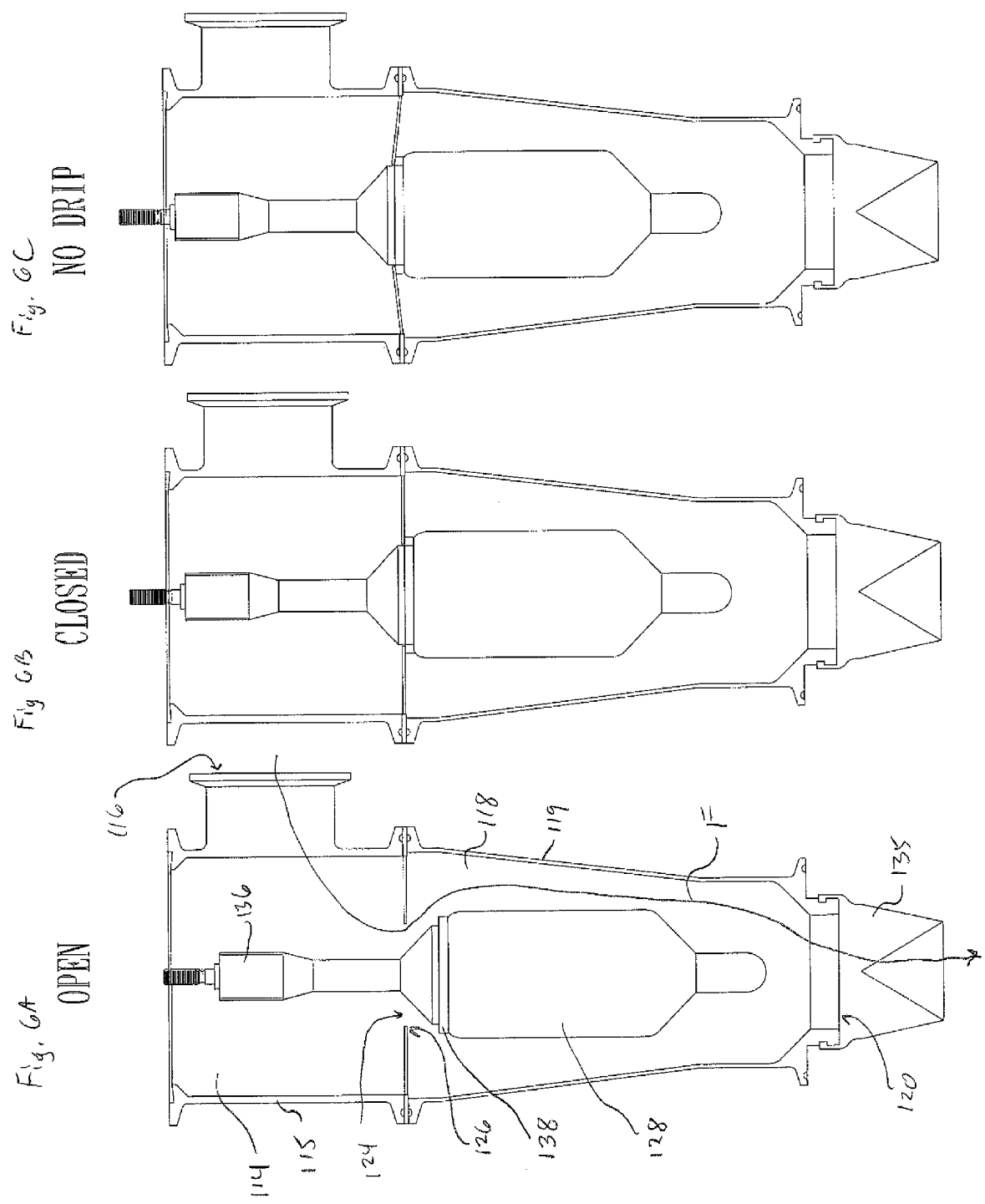

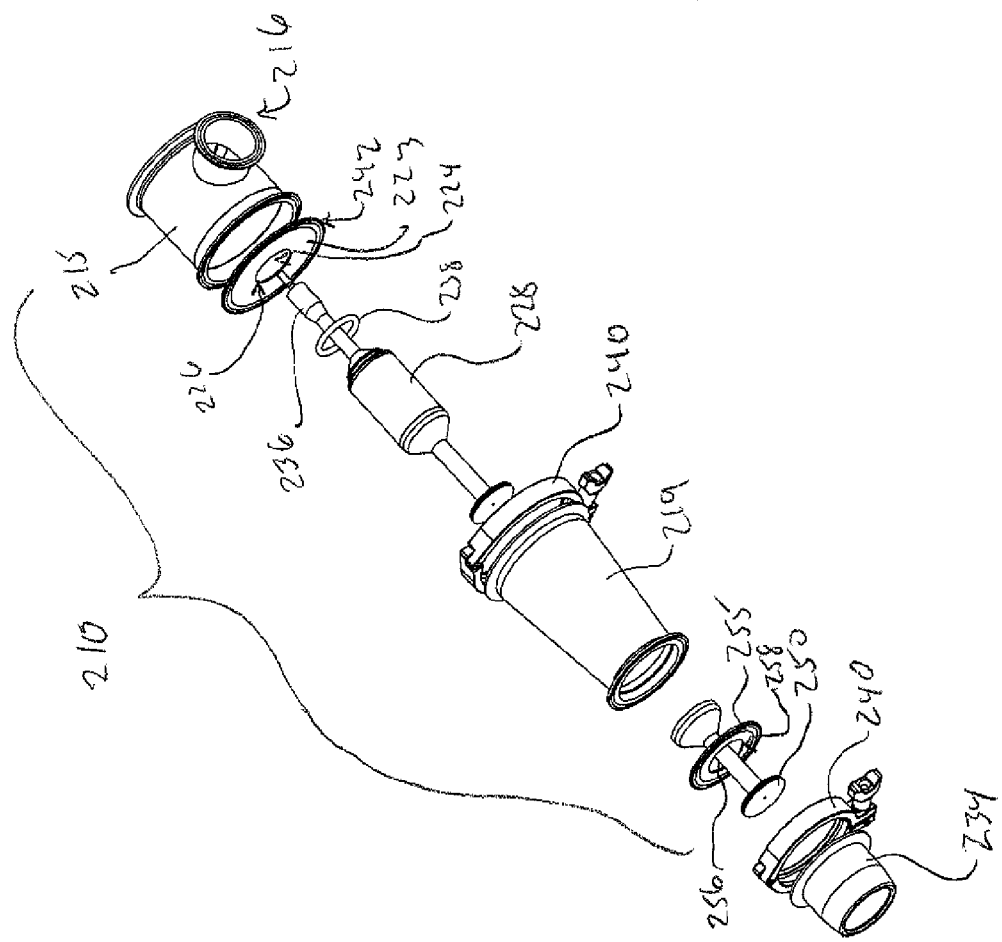

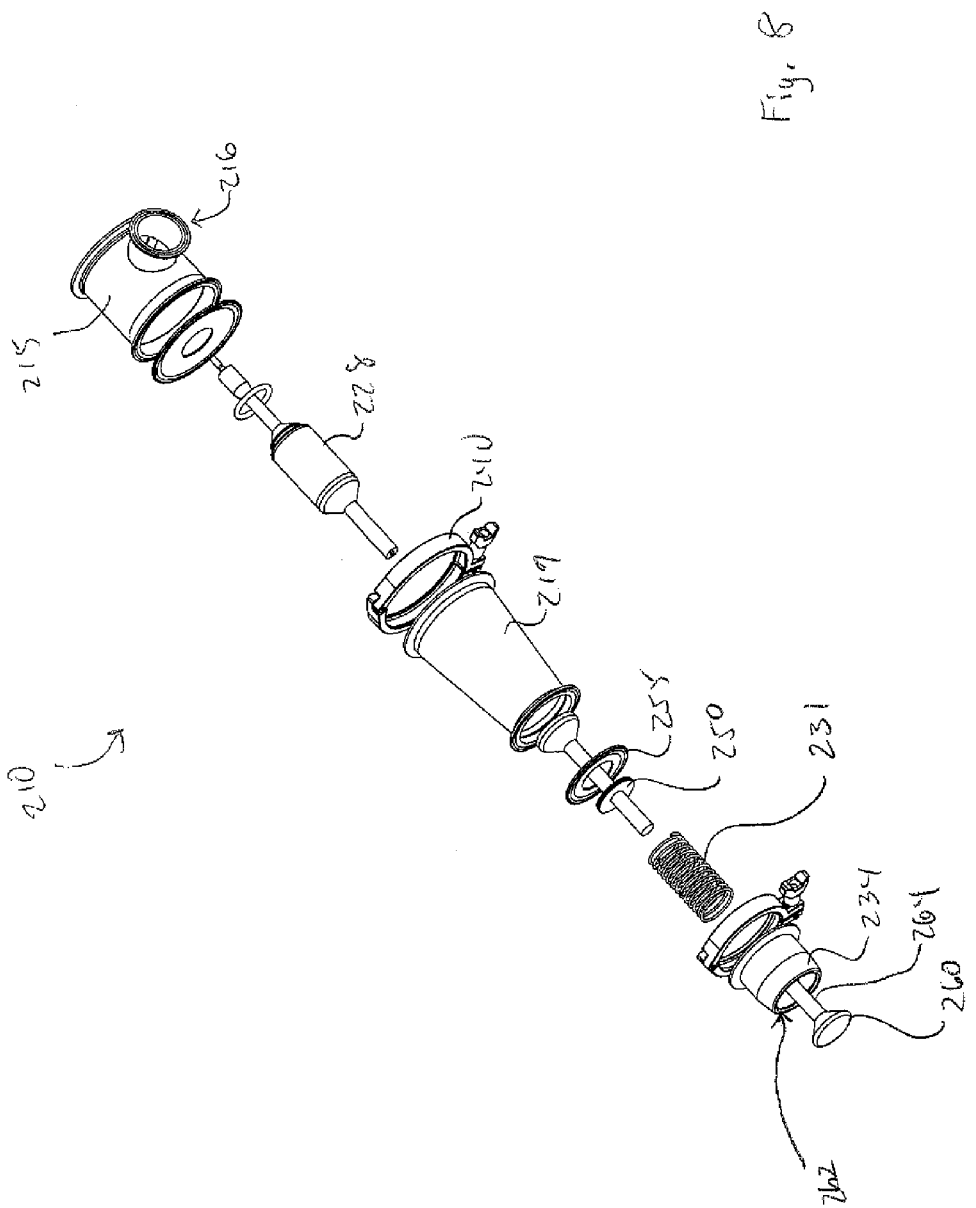

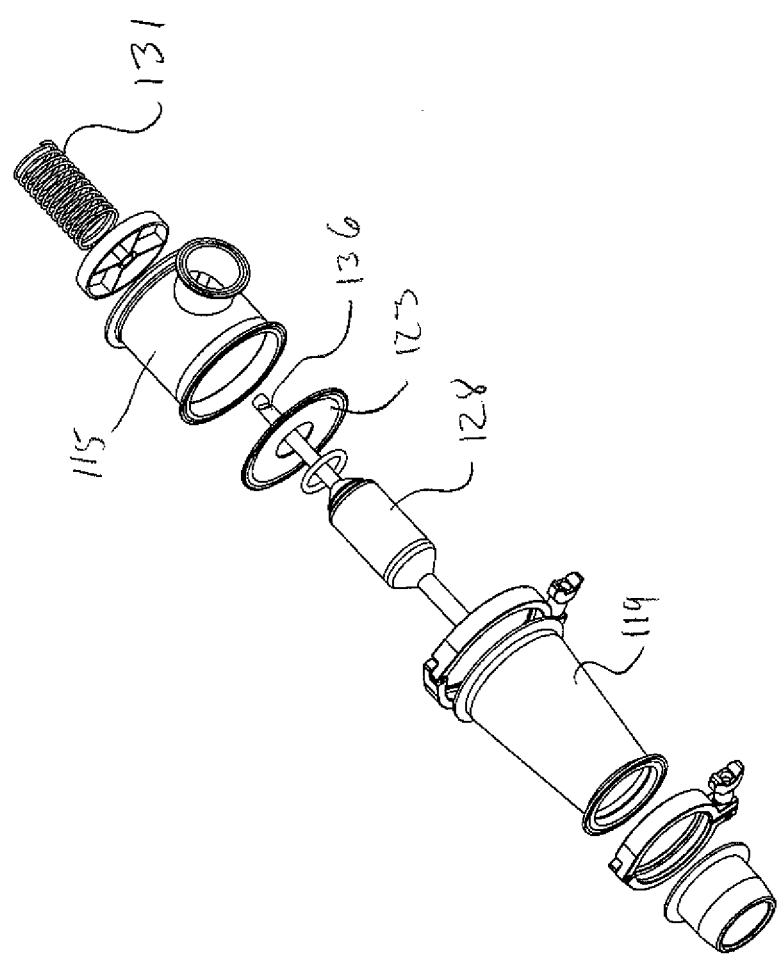

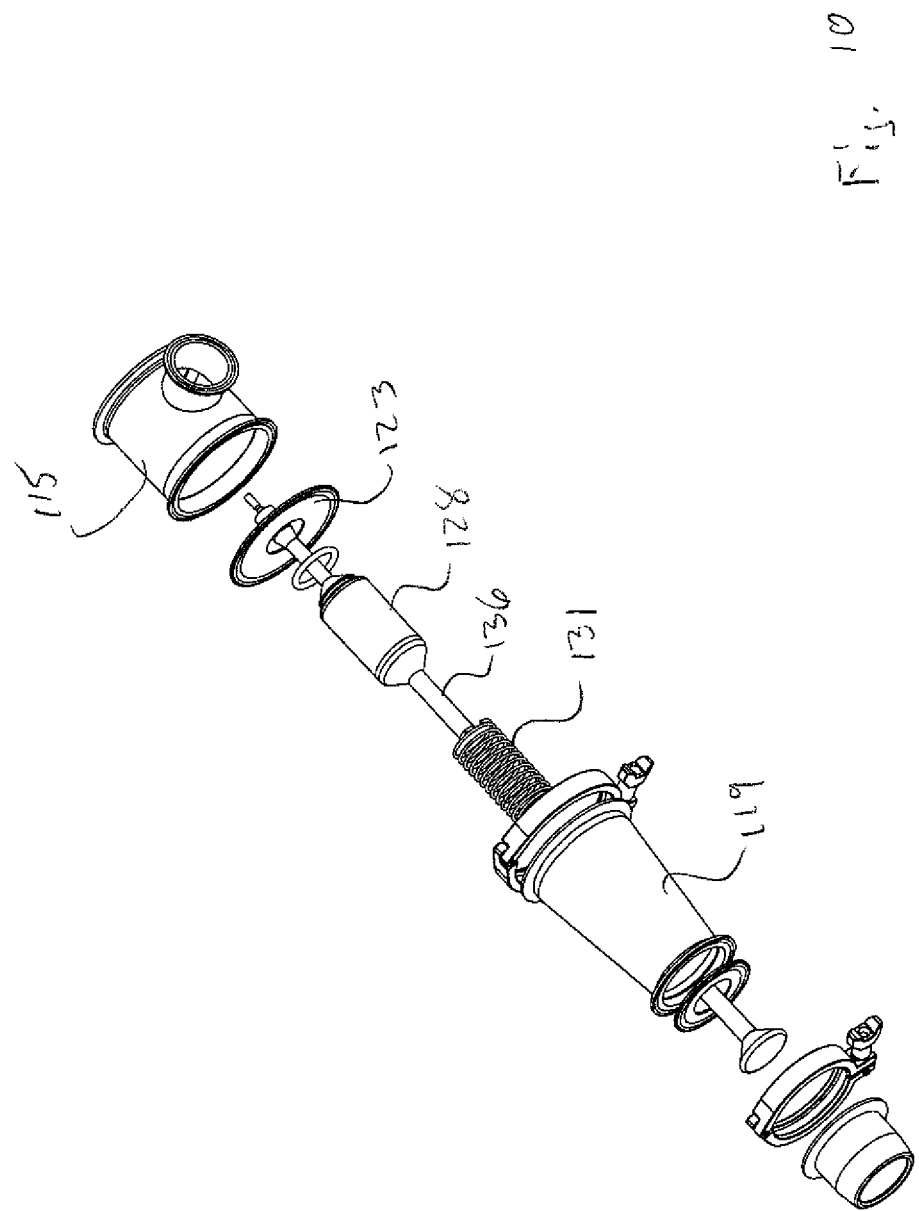

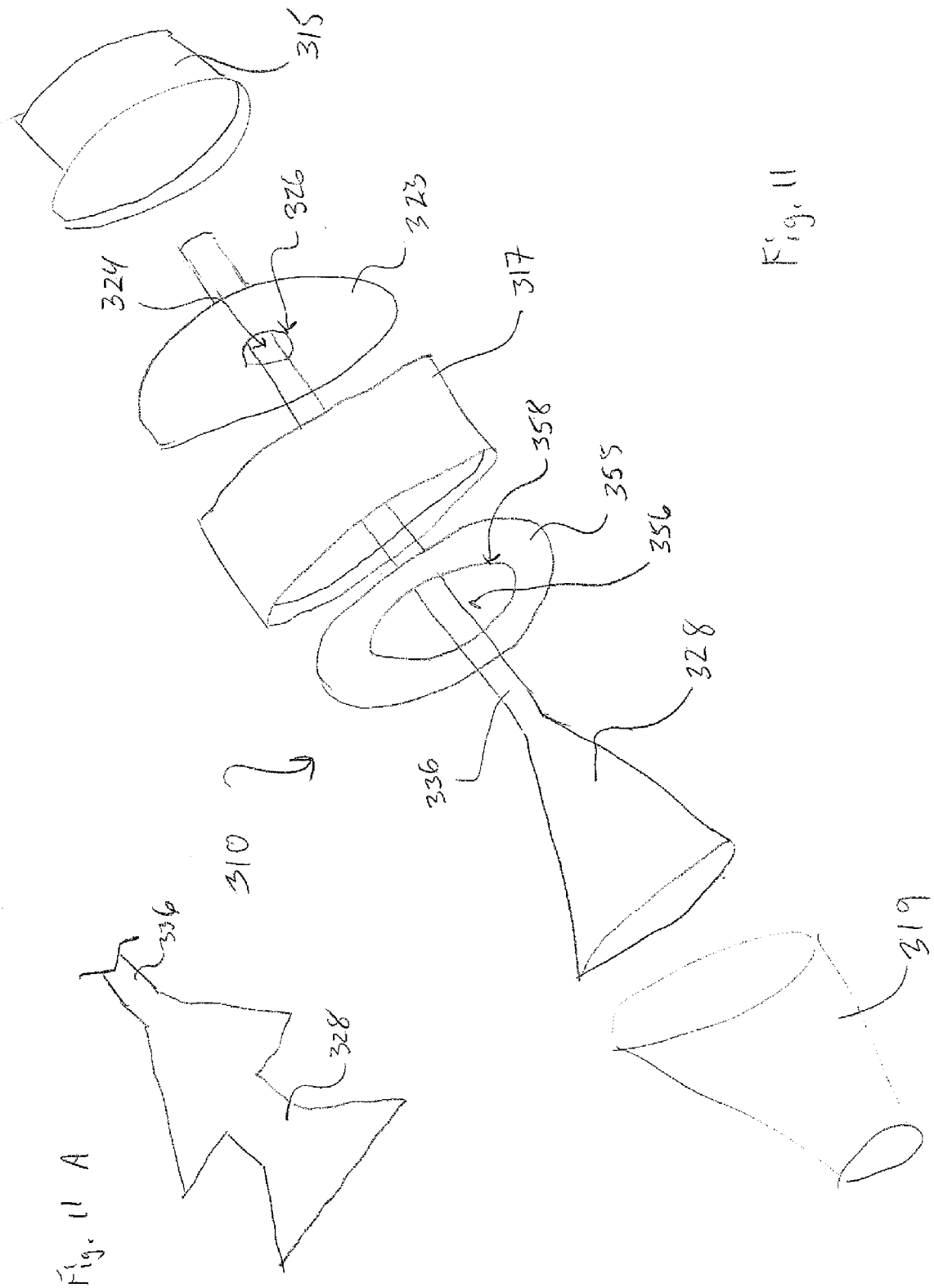

ically cylindrical but could have any suit-
VALVE

CROSS-REFERENCE TO RELATED APPLICATIONS

This application claims priority from, and incorporates by reference the disclosure of, U.S. Provisional Patent Application No. 61/318,304, filed on Mar. 27, 2010.

BRIEF DESCRIPTION OF THE DRAWINGS

FIG. 2 is an exploded perspective view of valve 110 as shown in FIG. 1 in combination with a screen pack 132 and a nozzle 134 in communication with outlet port 120;

FIG. 3 is an exploded perspective view of valve 110 as shown in FIG. 1 in combination with a flexible membrane 135 in communication with outlet port 120;

FIG. 4 is an exploded perspective view of valve 110 as shown in FIG. 1 in combination with a screen pack 132 and a nozzle 134 in communication with outlet port 120 and an actuator 130 connected to body 112 and plug 128 by way of stem 136;

FIG. 5A is a cross-sectional side elevation view of valve 110 in an "open" position;

FIG. 5B is a cross-sectional side elevation view of valve 110 in a "closed" position;

FIG. 5C is a cross-sectional side elevation view of valve 110 in a "no-drip" position;

FIG. 6A is a cross-sectional side elevation view of an alternate embodiment of valve 110 in an "open" position;

FIG. 6B is a cross-sectional side elevation view of an alternate embodiment of valve 110 in a "closed" position;

FIG. 6C is a cross-sectional side elevation view of an alternate embodiment of valve 110 in an "no-drip" position;

FIG. 7 is an exploded perspective view of a valve 210 similar to valve 110 but further including a second diaphragm plate 255 connected to outlet portion 218 at outlet port 219 and a second plug 250 connected to plug 238 via stem 252, in combination with a nozzle 234 in communication with outlet port 220;

FIG. 8 is an exploded perspective view of valve 210 similar in combination with nozzle 234 and a third plug 260 configured to seat against the outlet of nozzle 234;

FIG. 9 is an exploded perspective view of valve 110 in combination with a spring actuator;

FIG. 10 is an exploded perspective view of valve 210 in combination with a spring actuator;

FIG. 11 is an exploded perspective view of a portion of a valve 310 similar to valves 110 and 210 but including a single plug 328 controlling flow through, and deflection of, both a first diaphragm plate 323 and a second diaphragm plate 355; and FIG. 11A is a perspective view of an alternative embodiment of plug 328.

DETAILED DESCRIPTION OF THE DRAWINGS

Figure 1:
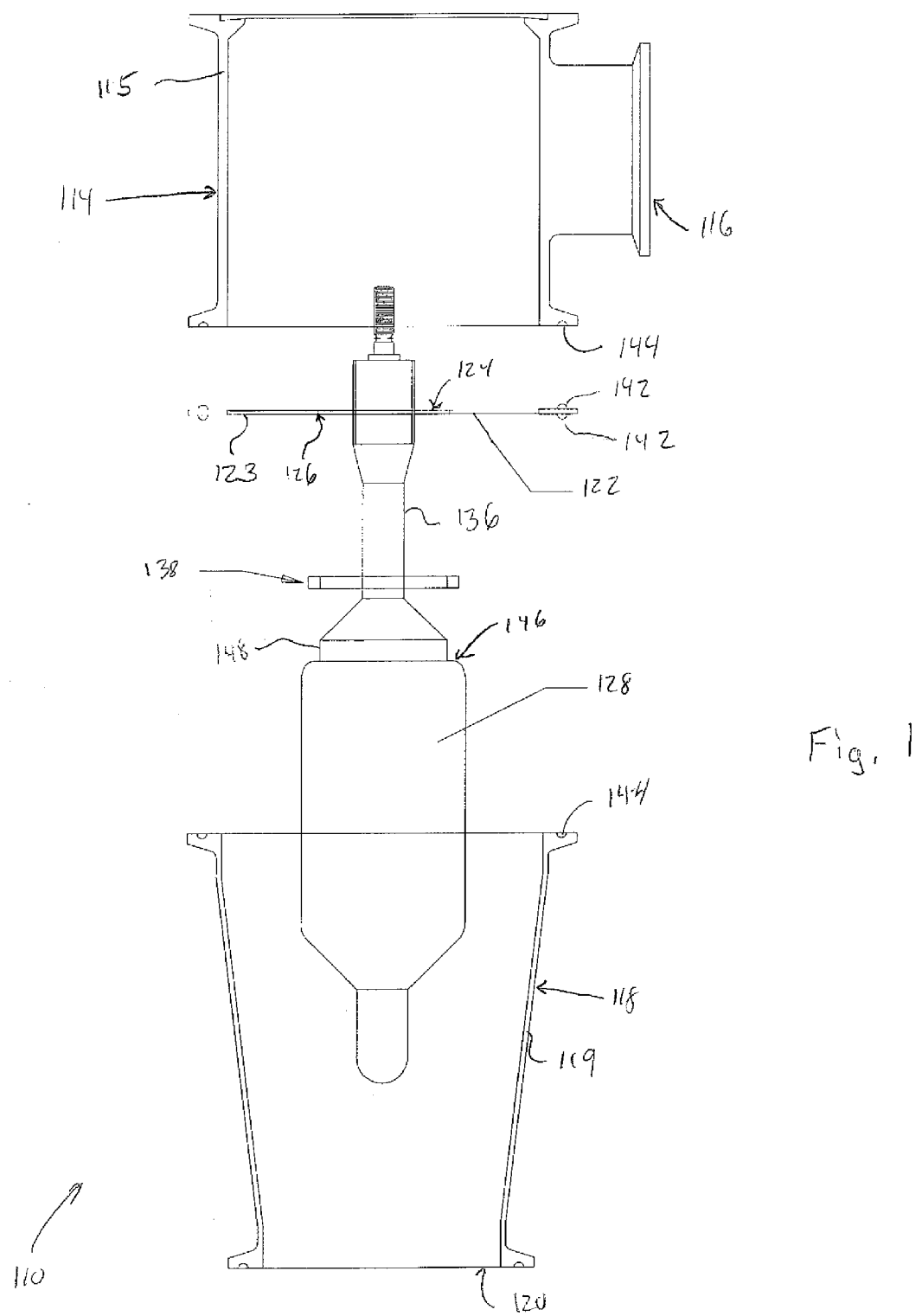
FIG. 1 is an exploded side elevation view of a valve 110 including a body 112 having an inlet portion 114, an inlet port 116, an outlet portion 118 and an outlet port 120, a diaphragm 122 defining an aperture 124 and seat 126 disposed between inlet portion 114 and outlet portion 118, and a plug 128 that can be moved to open and close aperture 124 and deflect diaphragm 122.

FIGS. 1-5C illustrate an embodiment of a valve 110 including a body 112 having an inlet portion 114, an inlet port 116, an outlet portion 118, and an outlet port 120. A flexible and resilient diaphragm 122 defining an aperture 124 and seat 126 is disposed between inlet portion 114 and outlet portion 118, thereby separating inlet portion 114 from outlet portion 118. A plug 128 is integrally or otherwise connected to a stem 136 by any suitable means. Stem 136 can be connected to an actuator 130 by any suitable means, including without limitation a threaded, pinned, or other connection. Actuator 130 can be operated to cause plug 128 to move toward and away from seat 126 such that plug 128 can open and close aperture 124 and deflect diaphragm 122, as will be discussed further below.

As shown in, for example, FIGS. 2 and 4, an optional nozzle 134 can be connected to outlet portion 118 or an extension thereof (for example, a spacer) in communication with outlet port 120 using a clamp 140 or otherwise. An optional screen pack 132 including one or more screens 132S can be disposed within nozzle 134. Screen pack 132 can further include a distributor 132D and/or other components, as would be recognized by one skilled in the art. Alternatively, as shown in, for example, FIG. 3, a flexible membrane (sometimes referred to as a tulip valve) 135 could be connected to outlet portion 118 or an extension thereof in communication with outlet port 120. One skilled in the art would recognize that the foregoing and/or other piping elements could be connected to outlet portion 118 in communication with outlet port 120 using any suitable means, for example, using a clamp 140. An optional gasket 133 or other form of seal can be provided at the interface of nozzle 134 and outlet port 120.

Valve body 112 and diaphragm 122 could be formed as a single, unitary piece or as multiple pieces joined together. Valve body 112 is shown in the drawings as including an inlet housing 115 and an outlet housing 119. In other embodiments, either or both of inlet housing 115 and outlet housing 119 could comprise two or more pieces. Inlet housing 115 is shown as being generally cylindrical but could have any suitable shape. Similarly, outlet housing 119 is shown as generally conical but could have any suitable shape.

Diaphragm 122 is shown as a flexible and resilient diaphragm plate 123 disposed between inlet housing 115 and outlet housing 119. A clamp 140 holds inlet housing 115, outlet housing 119 and diaphragm plate 123 together as an assembly. Valve body 112 and diaphragm 122 (whether unitary or multiple pieces) can be made of any suitable materials, including without limitation, plastic, stainless steel, other steels, aluminum, and other metals, as would be understood by one skilled in the art.

The periphery of diaphragm plate 123 can include one or more seals 142 which mate with inlet housing 115 and outlet housing 119. Seals 142 could be tri-gaskets or other gaskets or seals made of any suitable material and could be attached to or integrated with diaphragm plate 123. For example, seals 142 could be embodied as a piece of rubber or other suitable material wrapped around the periphery of diaphragm plate 123 or they could be embodied as rubber or other suitable material fused to the periphery of diaphragm plate 123.

In other embodiments, one or more seals 142 could be omitted and one or more separate gaskets (not shown) could be provided between diaphragm plate 123 and either or both of inlet housing 115 and outlet housing 119. In some embodiments, seals 142 and other gaskets could be omitted. For example, the materials and/or surface finishes of the mating parts might inherently provide adequate sealing without the need or desire for seals 142 or other gaskets or seal members. In embodiments using seals or gaskets, housing 115 and outlet housing 119 could, but need not, include grooves 144 for receiving portions of such seals or gaskets, as would be understood by one skilled in the art.

Plug 128 can be made of any suitable material, including without limitation plastic, stainless steel, other steels, aluminum, other metals, other materials or combinations of such materials. Plug 128 could be formed monolithically or from several pieces. Plug 128 preferably, but not necessarily, has an outer surface that is non-porous and smooth or otherwise free or relatively free of burrs, laps, or other structure that might cause the process material flowing through valve 110, as will be discussed further below, from adhering thereto in a manner that precludes easy cleaning thereof. Plug 128 is shown as having a particular shape but could have any other suitable shape, as would be recognized by one skilled in the art.

An optional plug seal 138, for example, a quad ring, Teflon® ring, or other form of gasket or seal member, can be provided to enhance the seal between plug 128 and seat 126 when plug 128 closes aperture 124. Plug 128 can include a shoulder 146 against which plug seal 138 can bear when plug 128 closes aperture 124. Plug seal 138 can be in snug contact with or "float" with respect to a neck 146 of plug 128. (In one typical embodiment, a quad ring could be in snug contact with neck 146. In another typical embodiment, a Teflon® ring could float with respect to neck 146.)

In some embodiments, plug seal 138 can be integrated with plug 128. For example, plug seal 138 could be embodied as a rubber other seal material fused to at least shoulder 146 of plug 128. Alternatively, plug 128 could be made of a material inherently capable of providing or enhancing a seal between plug 128 and seat 126. Alternatively or additionally, seat 126 could include an optional seal member (not shown). For example, rubber or another seal material could be fused to the portion of diaphragm 122 defining seat 126.

Actuator 130 is shown in FIG. 4 as a diaphragm actuator but could be embodied as any other suitable form of actuator, including without limitation an air-operated, solenoid, or manual actuator, capable of actuating plug 128, as discussed further below. In some embodiments, plug 128 could be actuated by process fluid pressure and/or a spring mechanism. For example, FIGS. 9 and 10 illustrate embodiments wherein a spring 131 biases plug 128 toward closed and "no-drip" positions, as will be discussed further below. In such embodiments, fluid or other process material forced through valve 110 (by, for example, a positive-displacement or other form of pump) could selectively counteract the biasing force provided by spring 131 to open valve 110, as would be recognized by one skilled in the art. Plug 128 could be actuated manually, as well.

In operation, valve 110 can be cycled between open, closed and so-called "no-drip" states by moving plug 128 between a first position in which plug 128 is free of seat 126 (in which state aperture 124 is open) and diaphragm 122 is in a normal, undeflected position, a second position in which plug 128 is seated against seat 126 (thereby closing aperture 124) with or without deflecting diaphragm 122, and a third position in which plug 128 is seated against seat 126 and substantially deflects diaphragm 122 toward inlet portion 114 and away from outlet portion 118, such that the free volume within the interior of outlet portion 118 and/or optional connected elements such as nozzle 134 and flexible membrane 135 with plug 128 in the third position is substantially greater than the free volume within the interior of outlet portion 118 and/or optional connected elements such as nozzle 134 and flexible membrane 135 when plug 128 is in the second position. Diaphragm 122 is sufficiently flexible and resilient such that diaphragm 122 substantially returns to or toward a normal, undeflected position when plug 128 is withdrawn therefrom.

As such, the pressure in outlet portion 118 and/or optional connected elements such as nozzle 134 and flexible membrane 135 can be reduced when plug 128 is moved from the second position to the third position. (In other words, a partial vacuum can be drawn in outlet portion 118 and/or optional connected elements such as nozzle 134 and flexible membrane 135 when plug 128 is moved from the second position to the third position.) This reduction in pressure can reduce or eliminate the tendency for residual process material disposed in outlet portion 118 (and/or optional connected elements such as nozzle 134 and flexible membrane 135) to drip when valve 110 is cycled from the open state to the no-drip state.

FIG. 5A shows valve 110 in the open state wherein valve plug 128 is withdrawn from seat 126, thereby allowing process material (for example, liquid, gas, gel, or slurry) to flow through valve 110 along the path shown, from a supply (not shown), through inlet port 116, inlet portion 114, aperture 124, outlet portion 118, and outlet port 120, and then to and through and optional nozzle 134. (As set forth above, optional screen pack 132 can be included in nozzle 134. Screen pack 132 is not shown in FIGS. 5A-5C.)

FIG. 5B shows valve 110 in the closed state wherein valve plug 128 is drawn against seat 126, thereby closing aperture 124 without substantially deflecting diaphragm 122. In this state, plug 128 substantially blocks the process flow path.

FIG. 5C shows valve 110 in the no-drip state wherein valve plug 128 is drawn further against seat 126, thereby deflecting diaphragm 122 so as to substantially increase the free volume within outlet portion 118 compared to the free volume within outlet portion 118 with plug 128 in the position shown in FIG. 5B.

FIGS. 6A-6C are similar to FIGS. 5A-5C except that nozzle 134 shown in FIGS. 5A-5C has been replaced with flexible membrane 135 in FIGS. 6A-6C. Again, nozzle 134 (which may include screen pack 132) and flexible membrane 135 are optional elements. In other embodiments, nozzle 134, screen pack 132, and flexible membrane 135 could be omitted without impairment to the structure and operation of valve 110.

FIG. 7 illustrates an embodiment of a valve 210 that is similar to valve 110 but that includes a second plug 250 and a second diaphragm 254. (Features 212-248 of valve 210 generally correspond, respectively, to features 112-148 of valve 110.) Second plug 250 is shown as connected to a stem 252 extending from plug 228 generally opposite stem 236 so that second plug 250 and main plug 228 can move in tandem. In other embodiments, first plug 228 and second plug 250 need not be connected and can be individually actuated, for example, using process fluid pressure and spring force, as discussed further above. Second diaphragm plate 255 defines an aperture 256 and a seat 258. The deflectable surface areas of diaphragms 222 and 254 could be the same or different.

Second diaphragm 254 is shown as a second diaphragm plate 255 connected to outlet housing 219 in communication with outlet port 220. In other embodiments, second diaphragm 254 could be located within outlet portion 218 of valve body 212, downstream of diaphragm 222 or within or connected to an additional housing (not shown) downstream of outlet port 220.

Valve 210 can be cycled between open, closed and so-called "no-drip" states by moving plug 228 and second plug 250 between: (1) first positions in which plugs 228 and 250 are free of seats 226 and 250, respectively (in which positions apertures 224 and 256 are open), and diaphragms 222 and 255 are in normal, undeflected positions; (2) second positions in which plugs 228 and 250 are seated against seats 226 and 258, respectively (thereby closing apertures 224 and 256), with or without deflecting diaphragms 222 and 255; and (3) third positions in which plug 228 is seated against seat 226 and deflects diaphragm 222 toward inlet portion 214 and second plug 250 is seated against second seat 258 and deflects second diaphragm 255 toward diaphragm 222. As such, a partial vacuum can be drawn in the region of outlet portion 218 between diaphragm 222 and second diaphragm 255, and a partial vacuum can be drawn in the region of outlet portion 218 between second diaphragm 255 and outlet port 220 (and/or optional connected elements such as nozzle 134 and flexible membrane 135). Valve 210 could be configured so that plugs 228 and 250 operate to initially close respective apertures 224 and 256 substantially simultaneously or sequentially. If sequentially, either plug could close the respective aperture before or after the other. Similarly, valve 210 could be configured so that plugs 228 and 250 operate to deflect respective diaphragms 222 and 254 substantially simultaneously or sequentially. If sequentially, either plug could deflect the respective diaphragm before or after the other. Diaphragms 222 and 255 are sufficiently flexible and resilient such that they substantially return to or toward their normal, undeflected positions when plugs 228 and 250 are withdrawn, respectively, therefrom.

FIG. 8 illustrates valve 210 further including a third plug 260 configured to seat against a rigid, third seat 262 defined by the outlet of nozzle 234. Alternatively, third seat 262 could be defined by valve body 212 or by another structure associated and in communication with outlet port 220. FIG. 8 also shows an optional spring, similar to spring 131, biasing plugs 228, 250 and 260 to the seated positions. Spring 231 also can bias first and second plugs 228 and 250 so as to deflect first and second diaphragm plates 223 and 255, respectively. Third plug 260 could be connected to and configured to operate in tandem with plugs 228 and 250 via stem 264. In such embodiments, third plug 260 could be positioned to seat against third seat 262 at the same time that one or both of plug 228 and second plug 250 seat against respective seats 226 and 258 and/or deflect respective diaphragms 222 and 254 or at different times. If at different times, the timing and sequence of seating and/or deflection could be selected as desired. Third plug 260 could, but need not, be configured to "float" on stem 264 and/or be made of a flexible, resilient material to preclude damage to third plug 260 and/or third seat 262 during operation of valve 210. In embodiments in which third plug 260 floats on stem 264, a spring or biasing means could be provided to bias third plug 260 toward third seat 262. Valve 110 could be similarly modified to include a second plug configured to seat against a seat defined by nozzle 134, valve body 112 or other structure associated and in communication with outlet port 120.

FIG. 11 illustrates an alternative embodiment of a valve 310 using multiple diaphragms. Valve 310 includes a body having an inlet portion 315, an outlet portion 319, and an intermediate portion 317 between inlet portion 315 and outlet portion 319. A first diaphragm 323 defining a first aperture 324 and a first seat 326 is disposed between inlet portion 315 and intermediate portion 317, and a second diaphragm 355 defining a second aperture 356 and a second seat 358 is disposed between intermediate portion 317 and outlet portion 319. A single plug 328 is configured to open and close both first aperture 324 and second aperture 356 either sequentially (in either order) or simultaneously. Similarly, plug 328 is configured to deflect both first diaphragm 322 and second diaphragm 354 either sequentially (in either order) or simultaneously. In the illustrated embodiment, apertures 324 and 356 are of different sizes and plug 328 is tapered to enable the foregoing mode of operation. In other embodiments, apertures 324 and 356 could be of the same or different sizes and plug 328 could have different shapes, as would be recognized by one skilled in the art. For example, plug 328 could be shaped as shown in FIG. 11A. Alternatively, separate first and second plugs 328 and 350 could be used in connection with the diaphragm structure shown in FIG. 11.

This disclosure illustrates and describes certain embodiments of a valve. One skilled in the art would recognize that the foregoing embodiments could be modified without departure from the scope of the invention as recited in the following claims. For example, features shown only in connection with a particular embodiment generally could be used in connection with other embodiments. Also, the diaphragm, plug, and/or restrictor locations shown could be varied. Further, additional diaphragms, plugs and/or secondary flow control means could be included.

The invention claimed is:

1. A valve comprising:
   a body having an inlet portion, an inlet port, an outlet portion and an outlet port;
   a flexible and resilient diaphragm defining an aperture and a seat, said diaphragm
disposed between said inlet port and said outlet port and separating said inlet portion from said outlet portion; and
   a plug;
   wherein said plug is movable between a first position in which said plug is free of said seat, a second position in which said plug is engaged with said seat and substantially closes said aperture, and a third position in which said plug is engaged with said seat and substantially closes said aperture and substantially deflects a portion of said diaphragm away from said outlet portion so that a free volume within said outlet portion with said plug in said third position is substantially greater than the free volume within said outlet portion with said plug in said second position; and
   wherein said body and plug are configured to allow flow of a process material over said plug and not through said plug.

2. The valve of claim 1 wherein said inlet portion comprises an inlet housing and said outlet portion comprises an outlet housing.

3. The valve of claim 2 wherein said diaphragm plate is interposed between said inlet housing and said outlet housing.

4. The valve of claim 1 wherein said inlet portion comprises an inlet housing and said outlet portion comprises an outlet housing.

5. The valve of claim 4 wherein said diaphragm plate is interposed between said inlet housing and said outlet housing.

6. The valve of claim 1 further comprising a seal member at the interface between said plug and said diaphragm.

7. The valve of claim 1 wherein the portion of said plug that engages with said diaphragm comprises a material able to form a seal between said plug and said diaphragm plate.

8. The valve of claim 1 in combination with a piping element connected to said valve in communication with said outlet port.

9. The apparatus of claim 8 wherein said piping element comprises a nozzle.

10. The apparatus of claim 8 wherein said piping element comprises a screen pack.

11. The apparatus of claim 8 wherein said piping element comprises a tulip valve.

12. The apparatus of claim 8 further comprising:
   a second diaphragm defining a second aperture and a second seat, said second diaphragm connected to said piping element; and
   a second plug, wherein said second plug is movable between a first position in which said second plug is free of said second seat, a second position in which said second plug is engaged with said second seat and substantially closes said second aperture, and a third position in which said second plug is engaged with said second seat and substantially closes said second aperture and substantially deflects a portion of said second diaphragm.

13. The apparatus of claim 12 wherein said second plug is connected to and movable in tandem with said plug.

14. The valve of claim 1 further comprising:
a second diaphragm defining a second aperture and a second seat, said second diaphragm connected to said body at said outlet port; and
a second plug, wherein said second plug is movable between a first position in which said second plug is free of said second seat, a second position in which said second plug is engaged with said second seat and substantially closes said second aperture, and a third position in which said second plug is engaged with said second seat and substantially closes said second aperture and substantially deflects a portion of said second diaphragm.

15. The valve of claim 14 wherein said second plug is connected to and movable in tandem with said plug.

16. The valve of claim 15 in combination with a piping element connected to said valve in communication with said outlet port.

17. The valve of claim 15 wherein said piping element comprises a nozzle.

18. The valve of claim 15 wherein said piping element comprises a tulip valve.

19. A valve comprising:
a body having an inlet portion, an inlet port, an outlet portion, and an outlet port;
a first flexible and resilient diaphragm defining a first aperture and a first seat, said first diaphragm disposed between said inlet port and said outlet port and separating said inlet portion from said first outlet portion;
a second flexible and resilient diaphragm defining a second aperture and a second seat, said second diaphragm in communication with said outlet port;
a first plug; and
a second plug;
wherein said first and second plugs are movable between first positions in which said first plug is free of said first seat and said second plug is free of said second seat, second positions in which said first plug is engaged with said first seat and substantially closes said first aperture and said second plug is engaged with and substantially closes said second aperture, and third positions in which said first plug is engaged with said first seat and substantially closes said first aperture and substantially deflects a portion of said first diaphragm towards said inlet portion and said second plug is engaged with said second seat and substantially closes said second aperture and substantially deflects a portion of said second diaphragm towards said inlet portion, and
wherein said body and said first plug are configured to allow flow of a process material over said first plug and not through said first plug.

20. The valve of claim 19 wherein said body comprises at least an inlet housing and an outlet housing and said first diaphragm is interposed between said inlet housing and said outlet housing.

21. The valve of claim 19 wherein said second diaphragm is disposed within said outlet portion.

22. The valve of claim 19 wherein said second diaphragm is disposed at said outlet port.

23. The valve of claim 19 wherein said first plug and said second plug are connected.

24. The valve of claim 20 wherein said first plug and said second plug are movable to close said first aperture and said second aperture simultaneously.

25. The valve of claim 19 wherein said first plug and said second plug are movable to close one of said first aperture and said second aperture before the other of said first aperture and said second aperture.

26. A valve comprising:
a body having an inlet portion, an inlet port, an outlet portion and an outlet port;
a flexible and resilient diaphragm defining a first aperture and a first seat, said diaphragm disposed within said body between said inlet port and said outlet port and separating said inlet portion from said outlet portion;
a second seat in communication with said outlet port;
a first plug; and
a second plug;
wherein said first plug is movable between a first position in which said first plug is free of said first seat, a second position in which said first plug is engaged with said first seat and substantially closes said first aperture, and a third in which said first plug is engaged with said first seat and substantially closes said first aperture and substantially deflects a portion of said diaphragm towards said inlet portion;
wherein said second plug is movable between a first position in which said second plug is free of said second seat and a second position in which said second plug is engaged with said second seat; and
wherein said body and said first plug are configured to allow flow of a process material over said first plug and not through said first plug.

27. The valve of claim 26 further comprising a stem coupling said first plug and said second plug.

28. The valve of claim 27 wherein said second plug floats with respect to said stem.

29. The valve of claim 27 further comprising a biasing member, said biasing member biasing said second plug toward a position with respect to said stem.

* * * * *

UNITED STATES PATENT AND TRADEMARK OFFICE
CERTIFICATE OF CORRECTION

PATENT NO. : 8,651,139 B2
APPLICATION NO. : 13/073758
DATED : February 18, 2014
INVENTOR(S) : Larry Bachner It is certified that error appears in the above-identified patent and that said Letters Patent is hereby corrected as shown below:

In the Claims

Please cancel claims 4 and 5;

Please amend claim 19 as follows:

In claim 19, at column 7, line 38, delete the word "first" before the word "outlet";

Please amend claim 24 as follows:

In claim 24, at column 8, line 16, delete the number "20" and insert in its place the number -- 19 --; and Please amend claim 26 as follows:

In claim 26, at column 8, line 37, after the word "third", insert the word -- position --.

Signed and Sealed this
Second Day of September, 2014

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,651,139 B2 | Page 1 of 1 |
| APPLICATION NO. | : 13/073758 | |
| DATED | : February 18, 2014 | |
| INVENTOR(S) | : Larry Bachner | |

It is certified that error appears in the above-identified patent and that said Letters Patent is hereby corrected as shown below:

On the title page, under abstract "29 Claims, 11 Drawing Sheets" should read --27 Claims, 11 Drawing Sheets--.

In the Claims

Please cancel claims 4 and 5;

Please amend claim 19 as follows:

In claim 19, at column 7, line 38, delete the word "first" before the word "outlet";

Please amend claim 24 as follows:

In claim 24, at column 8, line 16, delete the number "20" and insert in its place the number -- 19 --; and Please amend claim 26 as follows:

In claim 26, at column 8, line 37, after the word "third", insert the word -- position --.

This certificate supersedes the Certificate of Correction issued September 2, 2014.

Signed and Sealed this
Seventh Day of October, 2014

Michelle K. Lee
*Deputy Director of the United States Patent and Trademark Office*